US011019306B2

(12) United States Patent
Chen et al.

(10) Patent No.: US 11,019,306 B2
(45) Date of Patent: May 25, 2021

(54) COMBINING INSTALLED AUDIO-VISUAL SENSORS WITH AD-HOC MOBILE AUDIO-VISUAL SENSORS FOR SMART MEETING ROOMS

(71) Applicant: INTERNATIONAL BUSINESS MACHINES CORPORATION, Armonk, NY (US)

(72) Inventors: Stanley Chen, New York, NY (US); Kenneth W. Church, Croton-On-Hudson, NY (US); Vaibhava Goel, Chappaqua, NY (US); Lidia L. Mangu, New York, NY (US); Etienne Marcheret, White Plains, NY (US); Bhuvana Ramabhadran, Mount Kisco, NY (US); Laurence P. Sansone, Beacon, NY (US); Abhinav Sethy, Chappaqua, NY (US); Samuel Thomas, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 16/243,706

(22) Filed: Jan. 9, 2019

(65) Prior Publication Data
US 2019/0149769 A1  May 16, 2019

Related U.S. Application Data

(63) Continuation of application No. 15/722,704, filed on Oct. 2, 2017, now Pat. No. 10,230,922, which is a
(Continued)

(51) Int. Cl.
*H04N 7/14* (2006.01)
*H04N 7/15* (2006.01)
(Continued)

(52) U.S. Cl.
CPC ............... *H04N 7/15* (2013.01); *G10L 25/60* (2013.01); *H04N 7/147* (2013.01);
(Continued)

(58) Field of Classification Search
CPC ...................................................... H04N 7/14
See application file for complete search history.

(56) References Cited

U.S. PATENT DOCUMENTS

| 5,454,042 A * | 9/1995 | Drever .................. F16M 13/04 |
| | | 381/361 |
| 7,948,513 B2 | 5/2011 | Rockefeller et al. |

(Continued)

FOREIGN PATENT DOCUMENTS

| CN | 103514771 A | 1/2014 |
| GB | 2501471 A | 10/2013 |
| WO | WO2014078965 A1 | 5/2014 |

OTHER PUBLICATIONS

List of IBM Patents or Patent Applications Treated as Related dated Jan. 9, 2019, 2 pages.
(Continued)

*Primary Examiner* — Olisa Anwah
(74) *Attorney, Agent, or Firm* — Tutunjian & Bitetto, P.C.; Brian Welle

(57) ABSTRACT

A method of combining data streams from fixed audio-visual sensors with data streams from personal mobile devices including, forming a communication link with at least one of one or more personal mobile devices; receiving at least one of an audio data stream and/or a video data stream from the at least one of the one or more personal mobile devices; determining the quality of the at least one of the audio data stream and/or the video data stream, wherein the audio data stream and/or the video data stream having a quality above a threshold quality is retained; and combining the retained
(Continued)

audio data stream and/or the video data stream with the data streams from the fixed audio-visual sensors.

15 Claims, 6 Drawing Sheets

Related U.S. Application Data continuation of application No. 15/370,733, filed on Dec. 6, 2016, now Pat. No. 9,912,909, which is a continuation of application No. 14/952,751, filed on Nov. 25, 2015, now Pat. No. 9,584,758.

(51) Int. Cl.
    *H04W 12/06*     (2021.01)
    *H04W 12/00*     (2021.01)
    *G10L 25/60*     (2013.01)
    *H04L 29/06*     (2006.01)

(52) U.S. Cl.
    CPC ......... *H04W 12/003* (2019.01); *H04W 12/06* (2013.01); *H04L 63/08* (2013.01); *H04N 2007/145* (2013.01); *H04W 12/00503* (2019.01)

(56) References Cited

U.S. PATENT DOCUMENTS

| | | |
|---|---|---|
| 8,831,505 B1 | 9/2014 | Seshadri |
| 8,872,883 B2 | 10/2014 | Silva |
| 8,923,529 B2 | 12/2014 | McCowan |
| 2003/0208534 A1 | 11/2003 | Carmichael |
| 2014/0146970 A1 | 5/2014 | Kim et al. |
| 2014/0201400 A1 | 7/2014 | Beel et al. |
| 2014/0207867 A1 | 7/2014 | Kotler et al. |
| 2014/0272896 A1 | 9/2014 | Malik et al. |
| 2015/0264505 A1* | 9/2015 | Tsilfidis ............. H04S 3/00 381/303 |
| 2016/0050504 A1* | 2/2016 | Browne ............. H04L 12/18 381/66 |
| 2016/0295321 A1* | 10/2016 | Bauer ............. H04R 3/00 |

OTHER PUBLICATIONS

Himawan, I., "Speech Recognition Using Ad-Hoc Microphone Arrays," Submitted as a Requirement of the Degree of Doctor of Philosophy at Queensland University of Technology, Apr. 2010. (pp. 1-180).

Raykar, V. et al., Position Calibration of Microphones and Loudspeakers in Distributed Computing Platforms, IEEE Transactions on Speech and Audio Processing, vol. 13, No. 1, Jan. 2005. (pp. 70-83).

\* cited by examiner

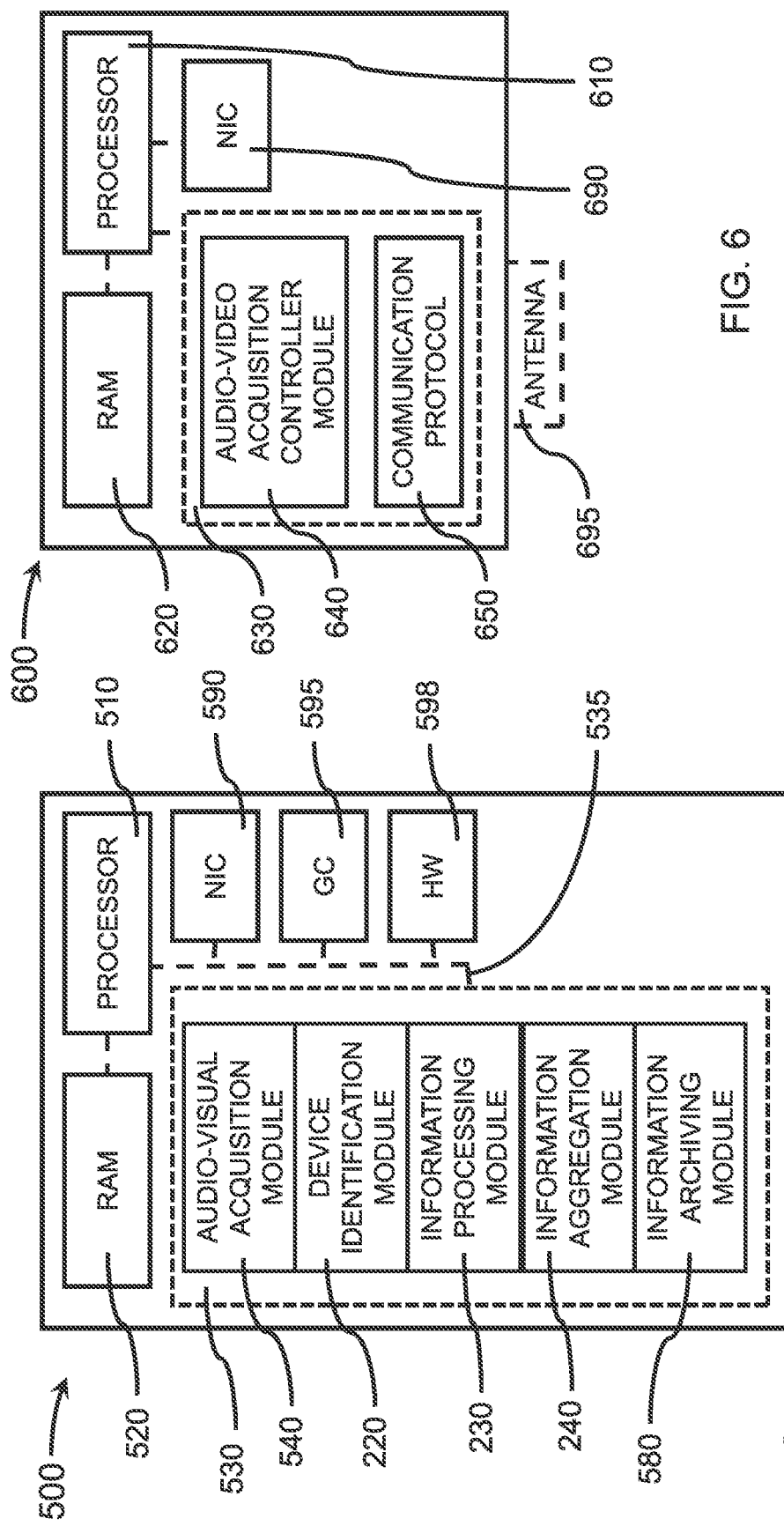

COMBINING INSTALLED AUDIO-VISUAL SENSORS WITH AD-HOC MOBILE AUDIO-VISUAL SENSORS FOR SMART MEETING ROOMS

BACKGROUND

Technical Field

The present invention relates to an approach to combining data streams from installed audio-visual sensors with ad-hoc personal mobile device audio-visual sensors, and more particularly to improving the quality of the existing audio-visual streams being captured by using audio and video sensors available on the mobile devices, which meeting participants are likely to carry.

Description of the Related Art

Meetings can play a very important role in present day business processes. One of the objects of the meeting can be to collect and process audio-visual recordings of meeting proceedings for archival, reference, and/or distribution to people not present at the meeting. These proceedings are usually collected via recordings from table-top microphones and video cameras placed at fixed positions in the room. Performance of these systems and applications may be directly correlated with the quality of the signals being captured.

Meetings may also be commonly attended via telephone/VOIP calls and other video conferencing software like Skype™, WebEx™, Vsee, Polycomm™ or other publically available conferencing systems. The participants may be at remote geographical locations connected to the meeting site over a network, for example, the Internet.

In a fixed arrangement of audio-visual (AV) equipment, the system may recognize the positioning of the sensors but is unaware of the positioning of persons present in a meeting, and may not be able to identify those who are speaking. The audio sensors can capture entire room acoustics and the video sensors can capture broad visual fields, however, such fixed position sensors can have difficulties focusing on individual speakers. Fixed audio sensors picking up an entire room's acoustics may introduce noise such as reverberation and background noise in the audio channel. Similarly, the quality of images captured by fixed visual sensors may be affected by the lighting and positioning of the subjects, which can introduce distortions in the visual channel.

Adding an ad-hoc arrangement of audio sensors can create further difficulties because the system is unaware of the spatial arrangement of the mobile audio sensors, as well as the positioning of the speakers.

SUMMARY

Principles and embodiments of the present disclosure relate to a method and system for utilizing personal mobile devices brought into a meeting room to augment the fixed position sensors already present.

A method of combining data streams from fixed audio-visual sensors with data streams from personal mobile devices including, forming a communication link with at least one of one or more personal mobile devices; receiving at least one of an audio data stream and/or a video data stream from the at least one of the one or more personal mobile devices; determining the quality of the at least one of the audio data stream and/or the video data stream, wherein the audio data stream and/or the video data stream having a quality above a threshold quality is retained; and combining the retained audio data stream and/or the video data stream with the data streams from the fixed audio-visual sensors.

An audio-visual acquisition system including, an antenna device configured to form a communication link with at least one of one or more personal mobile devices, and receive at least one of an audio data stream and/or a video data stream from the at least one of the one or more personal mobile devices; an information processing system configured to determine the quality of the at least one of the audio data stream and/or the video data stream, wherein the audio data stream and/or the video data stream having a quality above a threshold quality is retained; and an information aggregation system configured to combine the retained audio data stream and/or the video data stream with the data streams from the fixed audio-visual sensors.

A non-transitory computer readable storage medium comprising a computer readable program for combining data streams from fixed audio-visual sensors with data streams from personal mobile devices, wherein the computer readable program when executed on a computer causes the computer to perform the steps of forming a communication link with at least one of one or more personal mobile devices. At least one of an audio data stream and/or a video data stream is received from the at least one of the one or more personal mobile devices. The quality of the at least one of the audio data stream and/or the video data stream is determined, wherein the audio data stream and/or the video data stream having a quality above a threshold quality is retained. The retained audio data stream and/or video data stream is combined with the data streams from the fixed audio-visual sensors.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 5 is a block diagram of an exemplary data processing system configured to perform the functions and methods described herein in accordance with an illustrative embodiment;

FIG. 6 is a system for implementing respective embodiments of an audio-visual system controller, where the controller may be incorporated into an antenna device in accordance with an illustrative embodiment.

DETAILED DESCRIPTION

Figure 1:
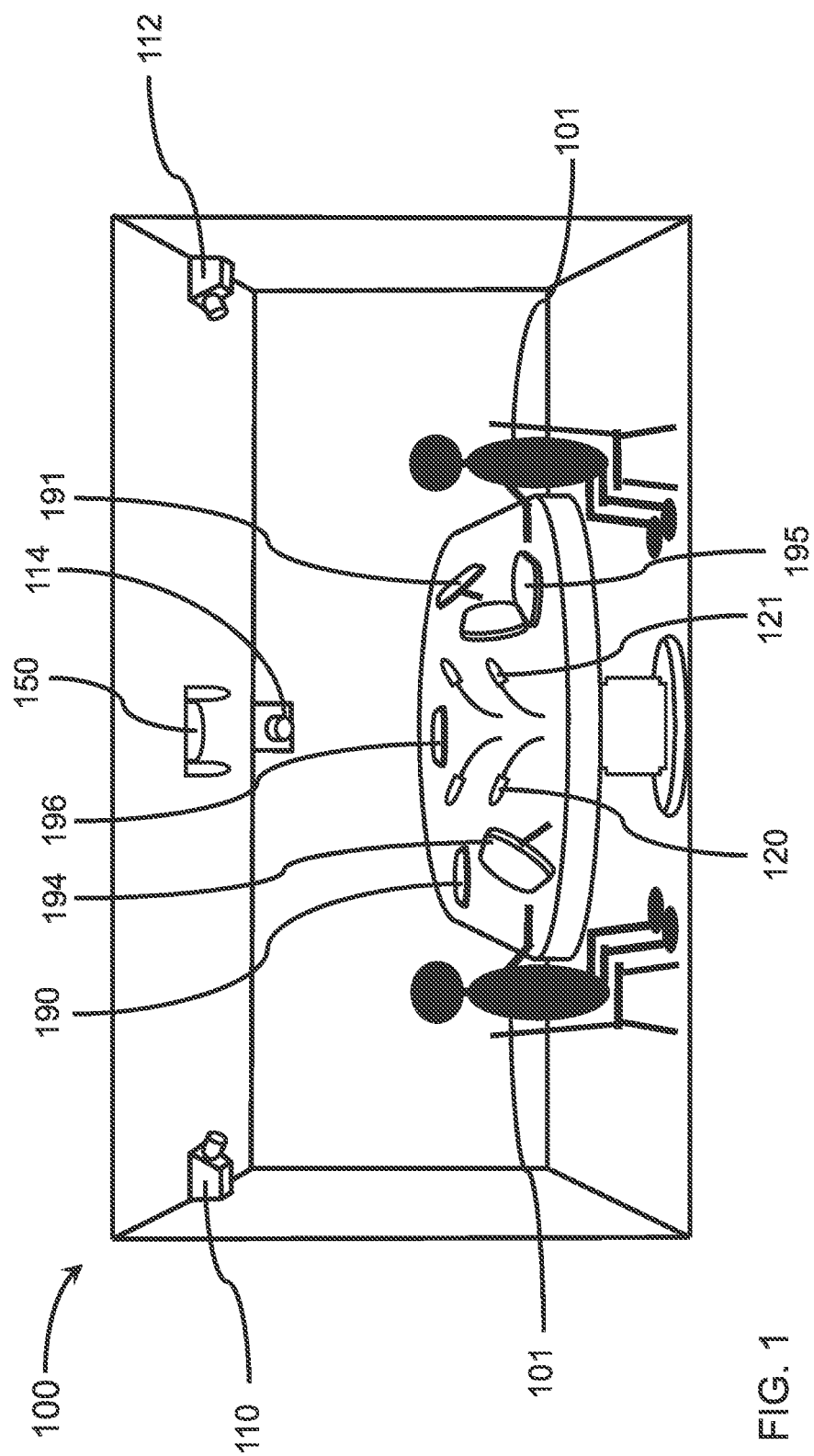
FIG. 1 is a view of a room with an audio-visual acquisition system in accordance with an illustrative embodiment.

Most meeting rooms these days have audio-visual capturing devices in the form of, for example, one or more microphones and one or more cameras. The audio-visual capturing devices may capture video images and sound, including speech, within the meeting room, for example during meetings and conferences. The captured audio and visual components may be processed to generate rich transcripts with speaker diarization. The audio capturing devices, however, may capture acoustics from the entire room including noise, and the visual capturing devices may capture wide visual fields with low individual resolution, which may result in obscured portions of speech and a lack of focus on speakers. Captured noise may include, but not be limited to, background conversations, random sounds generated by movement, and echoes and reverberations within the room. Captured video may be too general and lack focus on speakers or individual persons that are present; in addition, portions of the visual field may be blocked or occluded by standing persons and objects partially due to the fixed perspective of the video capture devices. While the installed sensors are referred to as fixed, this is in reference to a position within a room, and not intended to exclude articulated or swiveling cameras and microphones, which may change an angle or elevation but otherwise remain anchored to a fixed location. In various embodiments, other mobile microphones and cameras also may be installed and connected to an audio-visual acquisition system through wired or wireless connections to form a further expanded sensor array.

The quality and clarity of sound captured by the audio-visual capture devices may be improved by adding additional fixed position audio sensors to those pre-existing in a room; however, the audio-visual system may be limited to a small number of audio sensors. By combining external audio sensors to the audio-visual acquisition system in an ad-hoc manner (e.g., at the time of a meeting), additional audio sensors and additional channels of audio data may be added to the audio-visual system components already present to improve the captured audio. Similarly, external video sensors added to the audio-visual acquisition system in an ad-hoc manner can provided additional video sensors and channels of video data having fields of view different from the fixed cameras.

An aspect of the present disclosure relates to a meeting tool that can utilize the personal mobile devices brought into a meeting room to augment the fixed sensors already present.

Principles and embodiments of the present disclosure relate generally to combining audio and video from personal mobile devices with pre-existing room microphones and cameras in a room on an ad-hoc basis to improve the overall quality of the audio-visual data.

Principles and embodiments also relate generally to forming an ad-hoc network of personal mobile devices with an audio-visual acquisition system to provide individual audio-visual feeds from persons participating in a meeting or conference to the audio-visual acquisition system.

In one or more embodiments, information captured by one or more personal mobile devices is integrated with information captured by one or more audio sensors and/or video sensors of an audio-visual acquisition system. Integrated audio-visual data may be aggregated and stored for subsequent display or distribution.

In various embodiments, a user may select from multiple components of stored data, where some stored data was acquired through a pre-existing audio-visual system in a meeting room, and some stored data was acquired from one or more personal mobile devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that the present invention will be described in terms of a given illustrative architecture; however, other architectures, structures, components, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Another aspect of the disclosure relates to a method to improve the quality of the existing audio-visual streams being captured by using audio and/or video sensors available on mobile devices like smart phones and tablets which the meeting participants are likely to carry.

One or more embodiments may involve linking one or more personal mobile devices to an audio-visual acquisition system to form an array of audio sensors and video sensors in communication with an audio-visual acquisition system controller.

In one or more embodiments, a personal mobile device may include a mobile phone, a smart phone, a tablet computer, a laptop computer, a personal digital assistant, a digital camera, or other devices having a microphone and/or camera.

Referring now to the drawings in which like numerals represent the same or similar elements and initially to FIG. 1, an audio-visual acquisition system in a room is illustrated in accordance with an illustrative embodiment.

As shown in FIG. 1, a meeting room 100 may contain one or more fixed cameras to capture images and video recordings of the meeting room. In various embodiments, fixed cameras 110, 112 may be positioned on opposite sides of a conference table to capture video of persons 101 sitting on each side. An additional fixed camera 114 may be located in a position to also capture the majority of the room. The fixed cameras 110, 112, 114 may be configured to capture digital images and digital video, and communicate the images and video to an audio-visual acquisition system located within or outside of the room. The fixed cameras may be high-quality video cameras, where a high quality video camera may have a signal-to-noise ratio above a predetermined limit. While the fixed cameras have been described in particular locations, that is for illustrative purposes only, and should not be considered a limitation. The number and location of fixed cameras may vary.

One or more fixed microphones 120, 121 may be located within the room to capture sound, and in particular speech from persons within the room 100. In various embodiments, there may be an array of fixed microphones 120, 121 positioned around a conference table, where persons 101 located at the conference table may be in proximity to at least one fixed microphone. The fixed microphones 120, 121, however, may pick up more than one speaker at a time, and persons located further from the table may not have a fixed microphone in sufficient proximity. The fixed microphones may be high-quality microphones, where a high quality microphone may have a signal-to-noise ratio (SNR) above a predetermined limit, where a higher SNR provides better quality audio. The quality of the fixed microphone may also be determined by frequency response, directional properties/polar response, maximum operating sound pressure level (SPL) for a stated percentage of total harmonic distortion (THD), output sensitivity, and calibration of the various properties as would be known in the art. While the fixed microphones have been described in particular locations, that is for illustrative purposes only, and should not be considered a limitation. The number and location of fixed microphones may vary.

In one or more embodiments, wireless device(s) brought to a meeting, which may be personal mobile devices, may be detected by an audio-visual acquisition system, and invited to link to the audio-visual acquisition system. Personal mobile devices can include, but are not limited to, mobile phones 190, smart phones 191, tablet computers 194, lap-top computers 195, and personal digital assistants (PDAs) 196.

In various embodiments, an antenna device 150 may be located within the room 100, where the antenna device is a transceiver configured to form a communication link with one or more wireless device(s). The antenna device 150 may also be configured to use one or more communication protocols to manage communication with the personal mobile devices, and the antenna device 150 may serve as an access node for an audio-visual acquisition system.

Figure 2:
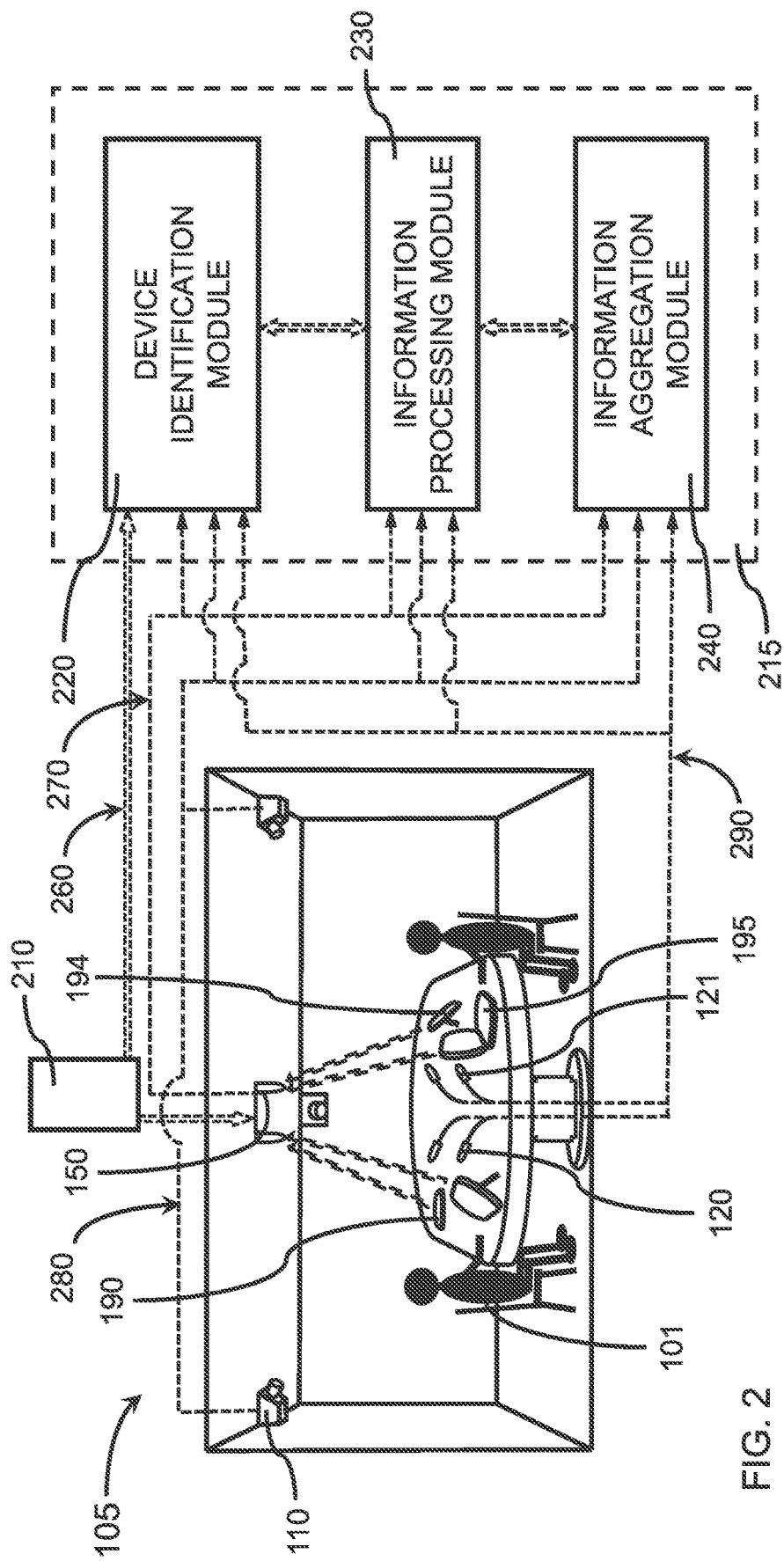
FIG. 2 is an audio-visual acquisition system having a plurality of cameras and microphones, and a plurality of personal mobile devices, in a meeting room in accordance with an illustrative embodiment.

FIG. 2 is an audio-visual acquisition system having a plurality of pre-existing cameras and microphones, where the pre-existing cameras and microphones may be fixed cameras and microphones, and a plurality of personal mobile devices, in a meeting room, where the sensors are interfaced to an audio-visual acquisition system in accordance with an illustrative embodiment.

In one or more embodiments, an audio-visual acquisition system 105 may include an information handling system 215 having a device identification module 220, an information processing module 230, and an information aggregation module 240. An audio-visual acquisition system 105 may also include an audio-visual acquisition controller 210, and one or more antenna devices 150. The audio-visual acquisition system 105 may be in communication with one or more fixed sensors including fixed microphones 120, 121 and fixed cameras 110, 112, 114, and one or more antenna devices 150 over a communication path. A communication path may be wired or wireless, and may facilitate transfer of data to and from the fixed sensors and antenna devices. For example, a lap-top computer 195 may be plugged into the network with a USB cable, while a smart phone 191 may form a wireless connection to the WLAN.

A plurality of personal mobile devices may be linked to an audio-visual acquisition controller 210 to form a distributed sensor network, where the distributed sensor network includes the cameras and microphones incorporated into the personal mobile devices. In various embodiments, the plurality of personal mobile devices form a wireless local area network (WLAN) with the antenna device 150 and audio-visual acquisition system, where the antenna device 150 may be a wireless gateway. The WLAN may be based on and utilize wireless-network standards. In one or more embodiments, the personal mobile devices may communicate with an audio-visual acquisition system through the antenna device 150 over wireless communication path(s) using a communication standard including, but not limited to Zigbee®, Bluetooth®, Wi-Fi™, Thread, Z-wave®, WeMo®, and ultrawideband (UWB).

In various embodiments, one or more antenna device(s) 150 may be positioned to cover the meeting room 100, wherein the entire area of the room is within the range of at least one antenna device 150. Additional antenna device(s) 150 may be utilized to ensure the required number of wireless devices can be served.

In various embodiments, each personal mobile device 190, 191, 194, 195, 196 may be a mobile node, and each antenna device 150 may be a fixed node and access point of the WLAN. In various embodiments, personal mobile devices may be connected to and in communication with the audio-visual acquisition system 105 over wired connections, for example, USB cables, using appropriate communication protocols. Software may be installed on the personal mobile devices that facilitate connection to the audio-visual acquisition system over the wireless or wired connection.

Authentication for a personal mobile device may include, but not be limited to, a login (e.g., user name and password), distance determination (e.g., inside or outside the meeting room), public key encryption, and/or a biometric.

In various embodiments, the antenna device 150 may be in communication with an audio-visual acquisition controller 210, where the audio-visual acquisition controller 210 is configured to detect, invite, and/or authenticate each personal mobile device 190, 191, 194, 195, 196 that enters the signal range of the antenna device 150. The antenna device 150, audio-visual acquisition controller 210, and/or device identification module 220 may initiate a signal transmitted by the antenna device 150 that constantly polls personal mobile devices within a signal range (e.g., the meeting room) for personal mobile devices that can be added to the network (e.g., WLAN) by broadcasting session initiations and/or invitations. The audio-visual acquisition controller 210 may use software based on wireless technologies, for example Bluetooth®, to detect and add mobile devices to the existing AV system.

A session may be initiated with a personal mobile device using, for example, Session Description Protocol (SDP) and Session Initiation Protocol (SIP). The audio-visual acquisition controller 210 may be configured to perform authentication of a personal mobile device and acknowledge the addition of the personal mobile device as a node to the WLAN. The microphones on the personal mobile devices may be combined with the fixed position microphones 120, 121 to form a microphone array. The audio-visual acquisition controller 210 and/or antenna device 150 may be configured to communicate with the personal mobile device 190, 191, 194, 195, 196 using a communication protocol.

In various embodiments, the audio-visual acquisition controller 210 may be incorporated into the antenna device 150, which may detect personal mobile devices within a signal range, and issue invitations to the personal mobile devices to form a communication link. A personal mobile device may respond to the invite and associate with the antenna device 150 using a session layer protocol (e.g., Universal Plug-n-Play (UPnP), Real-time Transport Protocol (RTP)/Secure Real-time Transport Protocol (SRTP)/Real-time Transport Control Protocol (RTCP), and Stream Control Transmission Protocol (SCTP)). In various embodiments, antenna device 150 and/or audio-visual acquisition controller 210 may be configured to receive requests from personal mobile devices to add the personal mobile device(s) to the WLAN. In various embodiments, a personal mobile device may use active scanning or passive scanning to detect the antenna device 150.

In one or more embodiments, digital data may be communicated from the one or more personal mobile devices 190, 191, 194, 195, 196, to the device identification module 220, the information processing module 230, and/or the information aggregation module 240 over a mobile device data communication path 270. In one or more embodiments, digital image data may be communicated from the one or more fixed digital video cameras 110, 112, 114, to the device identification module 220, the information processing module 230, and/or the information aggregation module 240 over a video data communication path 280. In one or more embodiments, digital audio data may be communicated from the one or more fixed microphones 120, 121, to the device identification module 220, the information processing module 230, and/or the information aggregation module 240 over an audio data communication path 290.

In various embodiments, the device identification module 220 may be configured to detect and add at least one mobile device to an existing network. The device identification module 220 may register each personal mobile device 190, 191, 194, 195, 196, acting as a node, and may assign a session identification (ID) for identifying and segregating incoming media streams (e.g., audio and visual data streams) from each personal mobile device. Software (e.g., mobile apps) may allow users to allow their devices to be registered with the device identification module 220, so that the device(s) are automatically added to the WLAN when they join the meeting. In various embodiments, the device identification module 220 may request and store meta data from each personal mobile device for labeling and identification of devices and/or the incoming media streams. Separate incoming media streams may be sorted into discrete files and data structures.

In one or more embodiments, the device identification module 220 may communicate with the antenna device 150 directly, or indirectly through the audio-visual acquisition controller 210 over a communication control path 260. Instructions, commends, and/or data may be sent over the communication control path 260 to control authentication, session initiation, session identification, device identification, and incoming media streams. The audio-visual acquisition controller 210 may be incorporated into the device identification module 220. The incoming media streams may be received by the antenna device 150 from the personal mobile devices and communicated to the device identification module 220 over a media stream data communication path 270.

In various embodiments, the device identification module 220 may communicate the identity of the personal mobile device and associated media stream to the information processing module 230 and/or information aggregation module 240.

In one or more embodiments, the information processing module 230 is configured to receive one or more media streams of audio and/or video data, and processes the data to determine the quality of the incoming media streams. The information processing module 230 may be configured to constantly monitor and ascertain the quality of audio/video received from each personal mobile device added to the network. Calibration tests may be run to determine quality and select mobile devices whose audio and video data streams should be used to achieve best performance. Personal mobile devices that are identified by the information processing module 230 as providing audio data and/or video data that is below a threshold quality level may be dropped from the network to make additional bandwidth available for other AV data streams. Personal mobile devices may be re-added to the network and re-sampled at a later time to determine if the AV data quality from a personal mobile device has improved. In various embodiments, feedback from the end user may be used to decide which audio sources to use. Selected audio and/or video source may be recorded in an information archiving system.

In various embodiments, tests may be done prior to the meeting and/or as the meeting progresses, where such tests ensure that the personal mobile devices and/or fixed sensors are spatially well placed and cover all the speakers while not becoming redundant recording sources. A way to measure distances between speakers is to allow each personal mobile device to generate a unique tone, which is picked up by the other personal mobile device(s). The distances between personal mobile devices can then be estimated by measuring lags between the recorded tones and also differences in tone amplitude. As the meeting progress, if certain personal mobile device start collecting noise (e.g., an AC/fan is switched on), these tests may determine that the personal mobile device should be repositioned or drop from the network.

In one or more embodiments, the information processing module 230 may be configured to ascertain whether the quality of the AV signal being received from the mobile devices can be used/is complementary to the information already being captured by the fixed camera(s) and fixed microphone(s) present in the room. The quality of the media stream(s) may be determined by calculating, for example, a signal-to-noise ratio (SNR), a peak signal-to-noise ratio (PSNR), a perceptual evaluation of the speech quality (PESQ) measure (e.g., ITU-T P.862 (February 2001)), the perceptual evaluation of video quality (PEVQ/PEVQ-S), etc., or combinations thereof. The information processing module may use task specific metrics to ascertain the quality of the inputs, which may include confidence scores, for automatic speech recognition, image recognition, audio-video speech recognition, video recognition and segmentation, etc.

In one or more embodiments, the information processing module 230 may be configured to combine the data from two or more media streams to improve an overall quality of the received audio-visual data. Data combination may be accomplished by beamforming methods, for example, blind beamforming, minimum variance distortionless response (MVDR), minimum output energy (MOE), Delay-and-Sum, Superdirective, or combinations thereof. Combining of media streams may involve weighting the separate media streams. The weighted streams may be added together to form the output signal. Beamforming may be employed to suppress interference and cross-talk.

In one or more embodiments, the information aggregation module 240 is configured to receive one or more media streams of audio and/or video data, and combine the data into one or more objects (e.g., file). The information aggregation module 240 captures audio-visual data using microphones and/or cameras available from the mobile device, and integrates the data from the personal mobile devices with the data streams from the fixed camera(s) and fixed microphone(s) to produce an audio-visual recording, for example, of a meeting. The objects may be stored in a tree data structure, hash table, bucket structure, and combinations thereof, as well as any other data structure known in the art. In various embodiments, the objects may be stored in user-defined data structures based on the designed algorithms for data processing. The information aggregation module 240 may be configured to allow a user to retrieve the raw uncombined individual data streams, or the combined and modified object. In various embodiments, the received audio and/or video data may have been processed by the information processing module 230. In various embodiments, the media data streams from the fixed sensors may bypass the information processing module 230, and be received directly by the information aggregation module 240 over the video data communication path 280 and/or audio data communication path 290 for recording and storage.

In one or more embodiments, the device identification module 220, information processing module 230, and information aggregation module 240 may be implemented in one or more separate data processing systems that are interconnected, or combined as an information handling system 215 in one data processing system.

In one or more embodiments, the audio-visual acquisition controller 210, device identification module 220, information processing module 230, and information aggregation module 240 can take the form of an entirely hardware embodiment, an entirely software embodiment or an embodiment containing both hardware and software elements. In various embodiments, one or more of the audio-visual acquisition controller 210, device identification module 220, information processing module 230, and information aggregation module 240 may be implemented in software, which includes but is not limited to firmware, resident software, microcode, etc. The program code for the software implemented audio-visual acquisition controller 210, device identification module 220, information processing module 230, and information aggregation module 240 may be stored on a non-transitory computer readable medium.

Figure 3:
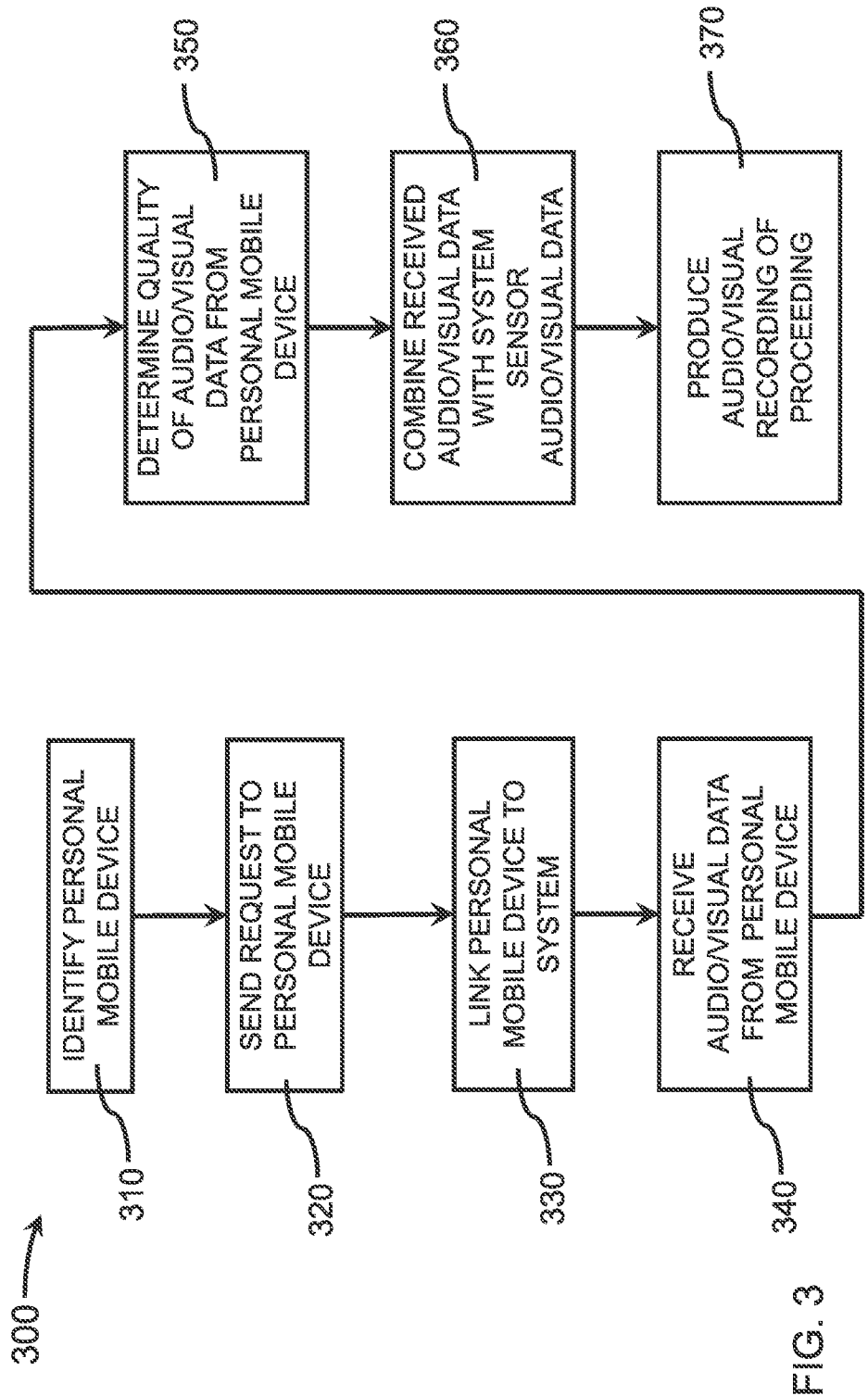
FIG. 3 is block/flow diagram of an exemplary method in accordance with an illustrative embodiment.

FIG. 3 is block/flow diagram of an exemplary method in accordance with an illustrative embodiment.

In block 310, a personal mobile device within a signal range or plugged into the local area network (LAN) may be detected, and a request for the personal mobile device to identify itself may be sent to the personal mobile device. In various embodiments, a request from a person mobile device to join the LAN or WLAN may be detected and processed. The personal mobile device may be identified by a media access control (MAC) address, such as a Wi-Fi™ MAC address, a Bluetooth® MAC address, etc. Identification of the personal mobile device may include authentication to confirm the personal mobile device is intended to be linked to the audio-visual acquisition system 105. At least one mobile device may be detected and added to an existing network to expand the network in an ad-hoc manner.

In block 320, an invitation to form a communication link and join the network (e.g., LAN, WLAN) may be sent to the identified personal mobile device. An invitation may include a request to authenticate the personal mobile device before a communication link is established with the personal mobile device. The request may include a request for identification (e.g., an IP address, MAC address, etc.) from the personal mobile device to distinguish a media data stream from the particular personal mobile device from other personal mobile devices linked to the WLAN, as well as a password.

In block 330, a communication link may be formed between the personal mobile device and the audio-visual acquisition system 105. A link may be established from the personal mobile device to the audio-visual acquisition system through an antenna device 150 and audio-visual acquisition controller 210, and the personal mobile device may be added to the WLAN, or through a network interface card, and the personal mobile device may be added to the LAN. An audio-visual data stream may be communicated from the personal mobile device to the audio-visual acquisition system over a wired or wireless communication path once a communication link is established.

In block 340, the audio-visual acquisition system may receive a data stream from the personal mobile device. The data stream may be transmitted to the antenna device 150 or over a wired communication path, and communicated to an audio-visual acquisition controller 210 and/or an information handling system 215. The antenna device 150 may receive a plurality of audio-visual data streams from a plurality of personal mobile devices, where the audio-visual data streams may be received at the same time (i.e., during a meeting). The audio-visual acquisition system 105 may be configured to handle a plurality of audio-visual data streams over a wired and/or wireless communication path. In various embodiments, the audio-visual acquisition system 105 may be configured to receive audio-visual data streams from remote participants via telephone/VOIP calls and other video conferencing software like Skype™, WebEx™ Vsee, Polycomm™ or any integrated and publically available conferencing system.

In block 350, the incoming media data stream(s) may be communicated to an information processing module 230. The incoming media data stream(s) may be constantly monitored, and the quality of audio/video data received from each personal mobile device may be evaluated. One or more incoming media data streams that do not meet a threshold quality may be rejected. Audio data streams and/or a video data streams from a personal mobile device having a quality above a threshold quality may be retained. A determination also may be made regarding whether an incoming data stream is complementary or extraneous to other previously or currently received AV data.

In various embodiments, two or more incoming audio data streams from personal mobile devices and/or fixed microphones may be combined to improve the overall quality of the audio data, for example, by using beamforming methods. Audio channels from a personal mobile device can help clear the cross talk effects in the installed microphone array, and may be used to isolate the speech from a particular speaker and help in automatic speech recognition (ASR)/speech-to-text (STT), speaker diarization, etc., or combinations thereof. Lapel-quality audio recording may be provided by personal mobile devices because of audio proximity compared to far-field microphones in room, especially if a meeting participant is "out-of-range" with respect to fixed audio sensors 120, 121.

In block 370, the audio-visual data received from the one or more personal mobile devices, fixed microphones, and/or fixed cameras may be combined into a digital recording. In various embodiments, the processed audio-visual data may be combined into an object (e.g., file) having a data structure. The audio-visual data may be audio-visual data previously identified as sufficient quality and/or complementary to the data obtained by the fixed AV sensors by the information processing module 230.

Figure 4:
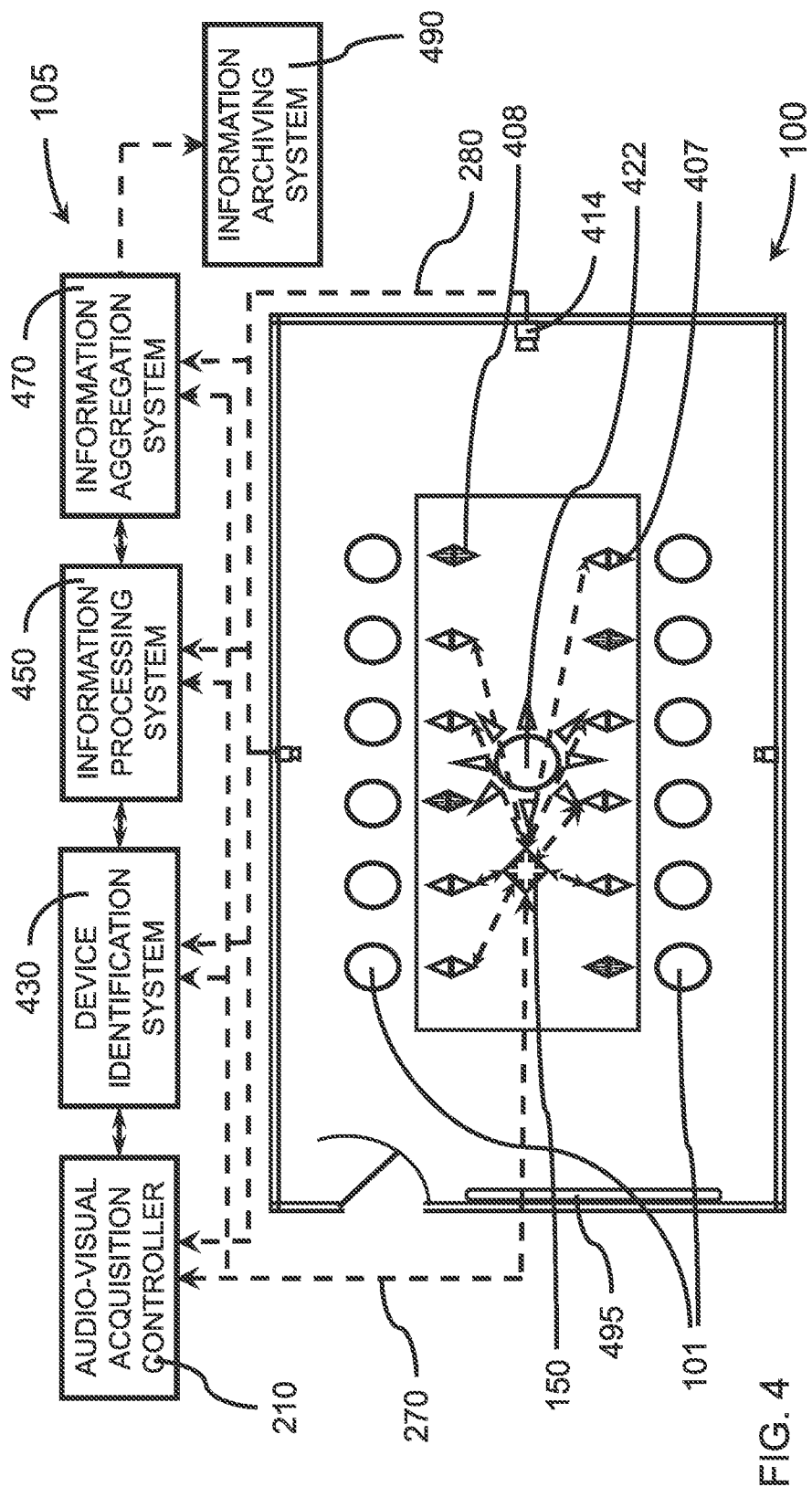
FIG. 4 is a block diagram of an audio-visual acquisition system in accordance with an illustrative embodiment.

FIG. 4 is a block diagram of an audio-visual acquisition system 405 in accordance with an illustrative embodiment.

At least one high quality fixed video camera 414 and at least one high quality fixed microphone 422 is located in a room 100, and coupled to an audio-visual acquisition system 105. One or more persons 101 may be present within the room 100, where at least a portion of the users have a personal mobile device 407 capable of forming a wireless link with a wireless network within the room 100, or a wired link to the audio-visual acquisition system 105. A personal mobile device 407 may be active or a personal mobile device 408 may be inactive.

In one or more embodiments, the AV data streams and/or the audio-visual object may be shown on a display 495 coupled to the audio-visual acquisition system 105. A display 495 may be located in the same room 100 or in a separate room for viewing the media data streams. In various embodiments, a plurality of audio-visual data streams may be shown as separate videos on the display 495 at the same time (e.g., picture-in-picture (PIP)). A user may switch between different stored or live media data streams to view the different media data streams on the display, and select the best (e.g., clearest, most pertinent for archiving, etc.) data streams for compilation in a final AV object/recording.

The audio-visual acquisition controller 210 may be coupled to the antenna device 150, and to a device identification system 430, information processing system 450, and information aggregation system 470, where data and commands may be communicated between the systems. The device identification system 430, information processing system 450, information aggregation system 470, and information archiving system 490 may be separate data processing systems, or a single data processing system with multiple virtual processing systems including one or more of the systems 430, 450, 470, 490. Each system 430, 450, 470, 490 may include processors, storage devices, memory, network cards and hardware for communicating with other systems, and be configured to perform the methods and functions of an audio-visual acquisition controller 210, a device identification module 220, an information processing module 230, and an information aggregation module 240, as described herein. The audio-visual acquisition controller 210, the antenna device 150, a device identification system 430, information processing system 450, information aggregation system 470, and information archiving system 490 may be interconnected in a wired and/or wireless network (e.g., LAN, WLAN), and connected to one or more sensors and personal mobile devices as an audio-visual network. Software may be installed on the personal mobile devices that facilitate connection to the audio-visual network. The methods and functions may be implemented by execution of computer code.

In various embodiments, information processing system 450 may include digital signal processing (DSP) hardware and software for preforming the quality analysis and beamforming functions, as described herein.

In various embodiments, information archiving system 490 may comprise memory and a database structure for storing the final AV object(s)/recording(s). The final AV object(s)/recording(s) may be compiled by the information aggregation system 470 and communicated to the information archiving system 490 for later retrieval and analysis.

FIG. 5 is a block diagram of an exemplary data processing system 500 configured to perform the functions and methods described herein in accordance with an illustrative embodiment.

In one or more embodiments, the data processing system 500 is suitable for storing and/or executing program code, and may include at least one processor(s) 510 coupled directly or indirectly to memory elements 520, 530 (e.g., ROM, RAM, FLASH, HDD, CD-ROM, etc.) through a system bus 535. The memory elements can include local memory employed during actual execution of the program code, bulk storage, cloud/remote storage, and cache memories which provide temporary storage of at least some program code in order to reduce the number of times code must be retrieved from bulk and/or cloud storage during execution. Software stored in memory elements 520, 530 may also include software for the data processing system to function (e.g., operating systems, application programs, device drivers, etc.).

In one or more embodiments, the data processing system 500 may include a network interface card (NIC) 590, a graphics card (GC) 595, and other hardware (HW) 598 known in the art for communicating and interfacing with other systems and users.

In one or more embodiments, the data processing system 500 may include an audio-visual acquisition module 540, a device identification module 220, an information processing module 230, an information aggregation module 240, and an information archiving module 580.

In various embodiments, an audio-visual acquisition module 540 may include computer code for configuring an antenna device and/or an audio-visual acquisition system controller to perform the functions of identifying one or more personal mobile devices; authenticating the at least one of the one or more the personal mobile devices before forming the communication link with the at least one of the one or more the personal mobile devices; and forming a communication link with at least one of one or more personal mobile devices.

In various embodiments, a device identification module 220 may include computer code for configuring a device identification system to perform the functions of registering the authenticated personal mobile devices to identify the received audio data stream and/or the video data stream with the particular authenticated personal mobile device; and providing a session identification to each personal mobile device.

In various embodiments, an information processing module 230 may include computer code for configuring an information processing system to perform the functions of determining the quality of the at least one of the audio data stream and/or the video data stream, wherein the audio data stream and/or the video data stream having a quality above a threshold quality may be retained, and audio data streams and/or video data streams having a quality below a threshold quality may be discarded; processing at least one of the audio data streams utilizing a beamforming method; and analyzing the audio data streams and/or video data streams using automatic speech recognition (ASR)/speech-to-text (STT), speaker diarization, keyword search and indexing, meeting summarization, sentiment analysis, social signal analysis, or combinations thereof.

In various embodiments, an information aggregation module 240 may include computer code for configuring an information aggregation system to perform the functions of combining the retained audio data stream and/or the video data stream with the data streams from the fixed audio-visual sensors; combining the at least one of the audio data stream and/or the video data stream with the data streams from the fixed audio-visual sensors into one or more objects; and storing the objects in a tree data structure, hash table, bucket structure, and combinations thereof. In various embodiments, the objects may be stored in user-defined data structures based on the designed algorithms for data processing.

In various embodiments, an information archiving module 580 may include computer code for configuring an information archiving system to perform the functions of storing the combined objects as audio-visual recordings of one or more meetings, where the recordings may be analyzed or displayed at a later time.

While particular functions have been described as related to particular modules and systems, this is for illustrative purposes only, and should not be construed as a limitation. The functions, modules, and systems may be interchanged and separated into different arrangements without departing from the spirit and scope of the invention.

FIG. 6 is a system for implementing respective embodiments of an audio-visual controller system 600, where the controller may be incorporated into an antenna device.

In one or more embodiments, the controller system 600 may include one or more processors 610 for executing computer code coupled to memory 620 and/or storage device(s) 630 for storing computer code, and a network interface card 690 for communication with other systems on the network. In various embodiments, the computer code may include instructions for performing the functions of an audio-visual controller module 640 including identifying wireless devices and forming communication links with the wireless devices. On or more communication protocols 650 may be stored on storage device(s) 630 to facilitate communication with wireless devices employing different protocols. In one or more embodiments, the system 600 may include an antenna array 695 for transmitting data to the wireless devices and receiving data from the wireless devices utilizing different communication protocols.

Figure 7:
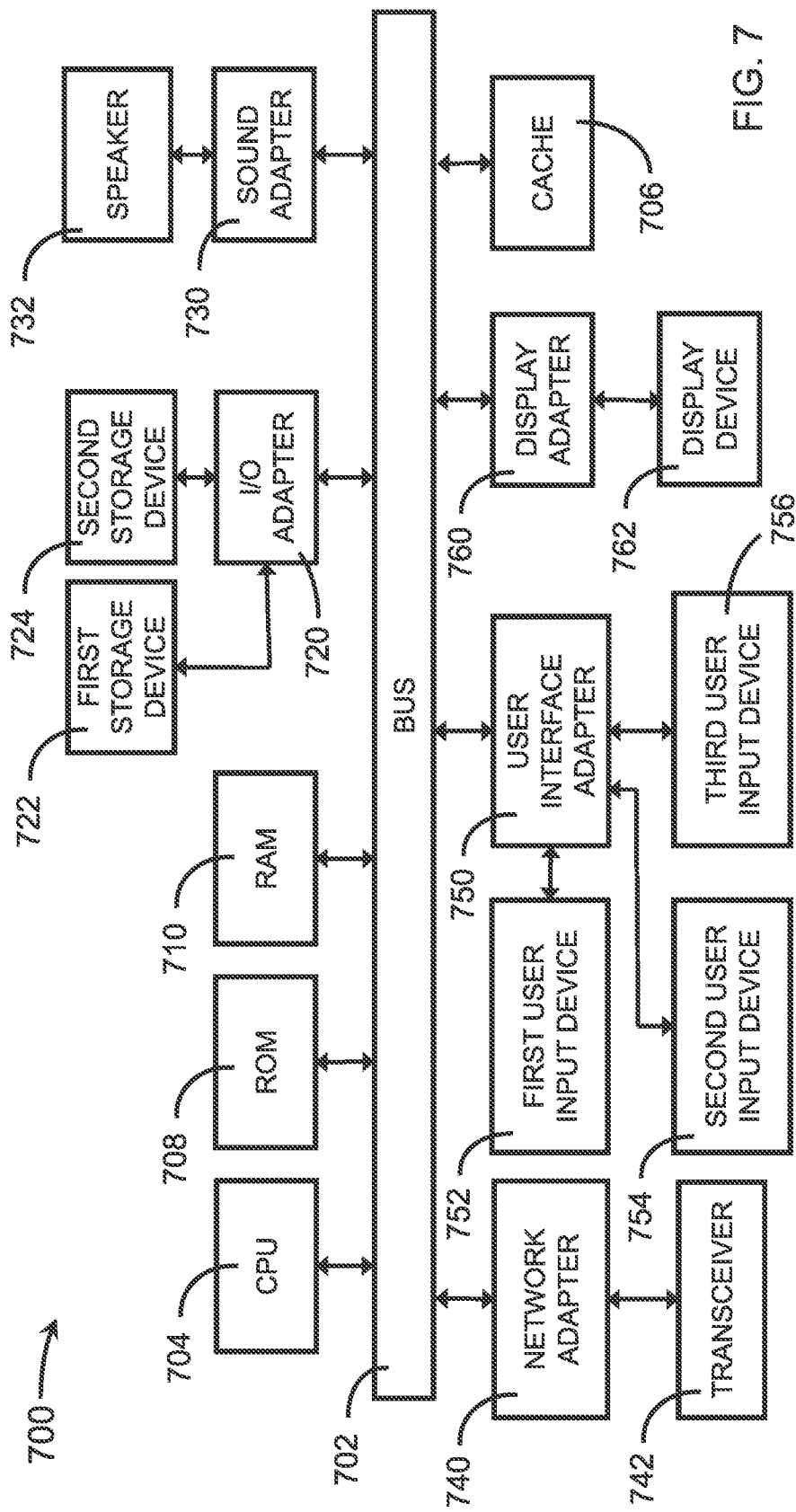
FIG. 7 is an exemplary processing system to which the present principles may be applied in accordance with an illustrative embodiment.

FIG. 7 is an exemplary processing system 700 to which the present principles may be applied in accordance with an embodiment of the present principles. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 230. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Moreover, it is to be appreciated that system 700 is a system for implementing respective embodiments of the present principles. Part or all of processing system 700 may be implemented in one or more of the elements of FIG. 4.

Further, it is to be appreciated that processing system 700 may perform at least part of the method described herein including, for example, at least part of method 300 of FIG. 3.

The video from the one or more personal mobile devices may be used for analysis focused on facial features for audio-visual ASR/STT, speaker diarization, and/or speaker recognition, whereas the video cameras in the room may be better suited for recognizing full body gestures for social signal analysis. Automatic speech recognition (ASR) may be done on the captured audio data, which may be stored as objects, for example by hidden Markov method (HMM) or neural networks, where the audio data may have been processed by a beamforming method. Analysis may be done on audio-visual recordings of a meeting.

In one or more embodiments, the AV data from the mobile devices and the AV data from the fixed sensors may be used for different purposes, for example, the video data from the personal mobile devices may be used for analysis focused on facial features for AV ASR or speaker recognition, whereas the video data from fixed cameras in the room may be used for recognizing full body gestures for social signal analysis. Audio data from a personal mobile device of a particular user may be used to isolate the speech from that speaker and help to generate rich transcripts in speaker diarization.

In a non-limiting example of an illustrative embodiment, each of the personal mobile devices may have a software application (e.g., smartphone/mobile device app) installed, where the software application provides functionality that connects the personal mobile devices to the audio-visual acquisition system running on an assigned IP address and port. The application may receive a push message from the audio-visual acquisition system informing the personal mobile device of service availability and requesting the personal mobile device to join the audio-visual network.

Audio and/or video from one or more personal mobile devices can be recorded and transmitted to the audio-visual acquisition system by the software application over the wired and/or wireless network, where the audio and video outputs from the personal mobile devices are also be audio/video inputs to the audio-visual acquisition system via appropriate interfaces. The software (e.g., mobile app) will use any means of network connectivity to connect to the audio-visual acquisition system: wired, existing Wi-Fi, cellular connection, etc. Each fixed sensor and/or personal mobile device may or may not be fully owned and controlled by the audio-visual acquisition system.

The audio and video outputs from the personal mobile devices and/or fixed sensors can be used with a speech/vision/language application, for example ASR, speaker diarization, keyword search and indexing, meeting summarization, sentiment analysis, social signal analysis, etc. The various analysis may be run offline later on the collected meeting data, which may be stored in the information archiving system.

Aspects of the present invention relate to a method for forming a communication link with at least one of one or more personal mobile devices; receiving at least one of an audio data stream and/or a video data stream from one of the one or more personal mobile devices; determining the quality of the at least one of the audio data stream and/or the video data stream, wherein the audio data stream and/or a video data stream having a quality above a threshold quality is retained; and combining the retained audio data stream and/or a video data stream with the data streams from the fixed audio-visual sensors.

Aspects of the present invention also relate to an audio-visual acquisition system comprising an antenna device configured to form a communication link with at least one of one or more personal mobile devices, and receive at least one of an audio data stream and/or a video data stream from one of the one or more personal mobile devices; an information processing system configured to determine the quality of the at least one of the audio data stream and/or the video data stream, wherein the audio data stream and/or the video data stream having a quality above a threshold quality is retained; and an information aggregation system configured to combine the retained audio data stream and/or the video data stream with the data streams from the fixed audio-visual sensors.

Aspects of the present invention also relate to a computer readable storage medium comprising a computer readable program for combining data streams from fixed audio-visual sensors with data streams from personal mobile devices, wherein the computer readable program when executed on a computer causes the computer to perform the steps of forming a communication link with at least one of one or more personal mobile devices; receiving at least one of an audio data stream and/or a video data stream from one of the one or more personal mobile devices; determining the quality of the at least one of the audio data stream and/or the video data stream, wherein the audio data stream and/or the video data stream having a quality above a threshold quality is retained; and combining the retained audio data stream and/or video data stream with the data streams from the fixed audio-visual sensors.

Having described preferred embodiments of a system and method for combining data streams from one or more fixed audio-visual sensors with data streams from one or more personal mobile devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An audio-visual acquisition system, comprising:
an audio-visual acquisition controller configured to communicate with one or more personal mobile devices and authenticate each of the one or more personal mobile devices to confirm the personal mobile device is intended to be linked to the audio-visual acquisition system before a communication link is established, wherein the one or more personal mobile devices are linked to the audio-visual acquisition controller to form a distributed sensor network, and wherein at least one additional mobile device is connectable to an existing distributed sensor network to expand the network in an ad-hoc manner;
an information handling system configured to communicate with one or more fixed sensors, and receive a plurality of audio-visual data streams over a wired and/or wireless communication path from the one or more personal mobile devices and one or more fixed sensors; and
an information aggregation system configured to combine two or more received audio-visual data streams to form a final audio-visual object/recording, and configured to allow a user to retrieve the raw uncombined individual audio-visual data streams and/or the final audio-visual object/recording.

2. The audio-visual acquisition system of claim 1, further comprising an antenna device configured to link one or more of the personal mobile devices to the audio-visual acquisition controller through the antenna device.

3. The audio-visual acquisition system of claim 2, wherein the audiovisual acquisition controller is configured to acknowledge the addition of the personal mobile device as a node to a distributed sensor network.

4. The audio-visual acquisition system of claim 3, wherein the antenna device is a transceiver configured to form a communication link with the one or more personal mobile devices using one or more communication protocols to manage communication with the one or more personal mobile devices.

5. The audio-visual acquisition system of claim 1, further comprising an information archiving system including memory and a database structure for storing the final audio-visual object/recording.

6. The audio-visual acquisition system of claim 5, wherein the information handling system is configured to analyze offline the final audio/visual object/recording stored in the information archiving system.

7. The audio-visual acquisition system of claim 6, wherein the information handling system is configured to determine the audio data stream and/or the video data stream of the audio-visual data stream have a quality above a threshold quality based on a signal-to-noise ratio (SNR) or a peak signal-to-noise ratio (PSNR) before combining the two or more received audio-visual data streams.

8. An audio-visual acquisition system, comprising:
one or more fixed cameras;
one or more fixed microphones; and
a data processing system including a processor, an audio-visual acquisition module configured to receive a video data stream from the one or more fixed cameras and from one or more personal mobile devices and an audio data stream from the one or more fixed microphones and from the one or more personal mobile devices, and an information processing module configured to determine the quality of the video data stream received from the one or more fixed cameras and from one or more personal mobile devices, and an information aggregation module configured to combine the one or more audio data streams from the fixed microphones and the one or more video data streams from the one or more fixed cameras with the audio data streams and video data streams from the one or more personal mobile devices into one or more objects.

9. The audio-visual acquisition system of claim 8, wherein the information processing module is further configured to analyze the audio data streams and/or video data streams using automatic speech recognition (ASR)/speech-to-text (STT), speaker diarization, keyword search and indexing, meeting summarization, sentiment analysis, social signal analysis, or combinations thereof.

10. The audio-visual acquisition system of claim 8, further comprising an information archiving module configured for storing the objects in a tree data structure, hash table, bucket structure, and combinations thereof.

11. The audio-visual acquisition system of claim 10, wherein the information processing module is further configured to evaluate the threshold quality of the audio data streams from the one or more personal mobile devices based on a signal-to-noise ratio (SNR), a peak signal-to-noise ratio (PSNR), a perceptual evaluation of the speech quality (PESQ) measure, or the perceptual evaluation of video quality.

12. An audio-visual acquisition system, comprising:
one or more fixed cameras within a meeting room;
one or more fixed microphones within the meeting room;
an antenna device configured to form a communication link with one or more personal mobile devices;
an audio-visual acquisition controller configured to communicate with the one or more personal mobile devices within the meeting room through the antenna device;
an information handling system configured to receive a plurality of audio-visual data streams over a wired and/or wireless communication path, and configured to communicate with the one or more fixed cameras and one or more fixed microphones, wherein the information handling system includes a device identification module configured to detect and add at least one mobile device within the meeting room to a distributed sensor network; and
an information aggregation system configured to combine two or more received audio-visual data streams to form a final audio-visual object/recording, and configured to allow a user to retrieve the raw uncombined individual audio-visual data streams and/or the final audio-visual object/recording.

13. The audio-visual acquisition system of claim 12, wherein the device identification module is further configured to assign a session identification (ID) for identifying and segregating incoming audio-visual data streams from each personal mobile device.

14. The audio-visual acquisition system of claim 13, wherein the information handling system includes an information processing module configured to receive one or more audio-visual data streams, and is configured to process the audio-visual data streams to determine the quality based on a signal to noise ratio (SNR).

15. The audio-visual acquisition system of claim 14, wherein the information handling system includes an information aggregation module configured to receive one or more audio-visual data streams and combine the one or more audio-visual data streams into one or more objects.

* * * * *